S. G. REED.
Tire-Heating Apparatus.
No. 158,522. Patented Jan. 5, 1875.
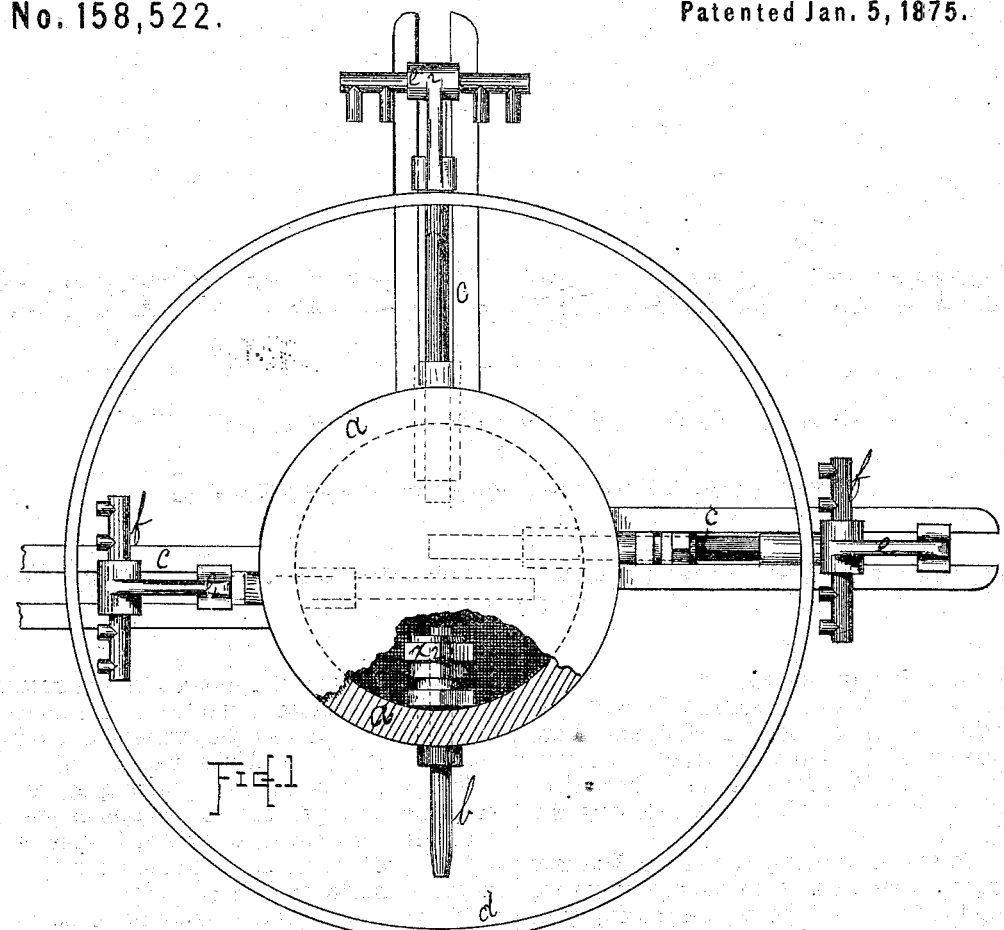
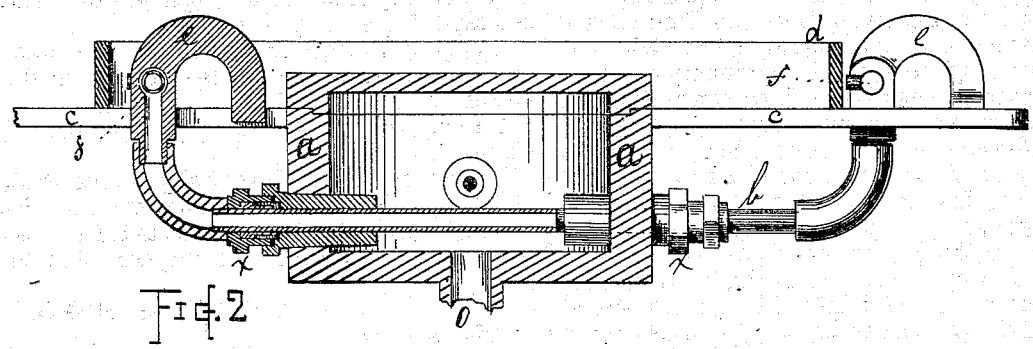
Witnesses
Solomon Flagg
Eliza H. Flagg
Inventor
Samuel G Reed

UNITED STATES PATENT OFFICE.

SAMUEL G. REED, OF WELLESLEY, MASSACHUSETTS.

IMPROVEMENT IN TIRE-HEATING APPARATUS.

Specification forming part of Letters Patent No. 158,522, dated January 5, 1875; application filed June 15, 1874.

*To all whom it may concern:*

Be it known that I, SAMUEL G. REED, of Wellesley, in the county of Norfolk and State of Massachusetts, have invented Improvements in Apparatus for Heating Wheel-Tires by the use of gas, of which the following is a specification:

The object of my invention is to facilitate the setting of wheel-tires by the use of gas for heating the same, and thereby dispensing with the use of large fires, which are attended with much inconvenience and danger, especially in c ties, where their use is most requisite.

In the accompanying drawings, Figure 1 represents a plan of my apparatus, in which $a\ a$ is a hollow cylinder, in the periphery of which are inserted gas-tubes $b\ b$, so constructed as to slide or telescope within each other to admit of extension, so as to adapt them to a larger or smaller circle. The same result may be effected by the use of flexible tubes attached to the cylinder or to a circular pipe or tube. Attached to the cylinder are slotted arms or supports $c\ c\ c$, upon which rests the tire $d\ d$; also, the guards $e\ e$ and $e^2$, into which guards are inserted the gas burners or jets $ff$, so constructe l as to turn in the guards, thus admitting the tire to be placed either side of the guards, and bringing the flame in contact with the external or internal surfaces of the tire. The guards $e\ e$ also serve to protect the burners or jets from injury by contact with the tire, as at $e^2$.

In Fig. 2 may be seen packing-boxes $x\ x$, which serve to prevent the escape of gas between the internal and external telescoping pipes, which boxes may be outside of the cylinder, or inside, as in Fig. 1, $x^2$.

The pipes or tubes $b\ b$ may be so placed as not to radiate from the center of the cylinder, but to slide past the center and by each other, thus allowing of sufficient length of tube without requiring so large a cylinder.

The gas may be admitted into the cylinder at any convenient point in the sides, or at the bottom, as at $o$, Fig. 2.

Having thus described my apparatus, I claim—

The combination, substantially as described, of the cylinder $a$, slotted supports $c\ c\ c$, telescoping pipes $b\ b\ b$, guards $e\ e\ e^2$, and swiveled burners $fff$, as and for the purpose set forth.

SAMUEL G. REED.

Witnesses:
 JOEL MOULTON,
 ROBERT SMALLE.